(12) United States Patent
Todd

(10) Patent No.: US 10,210,551 B1
(45) Date of Patent: Feb. 19, 2019

(54) CALCULATING DATA RELEVANCE FOR VALUATION

(71) Applicant: EMC Corporation, Hopkinton, MA (US)

(72) Inventor: Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 15/236,684

(22) Filed: Aug. 15, 2016

(51) Int. Cl.
*G06F 17/30* (2006.01)
*G06Q 30/02* (2012.01)

(52) U.S. Cl.
CPC ..... *G06Q 30/0278* (2013.01); *G06F 17/3053* (2013.01)

(58) Field of Classification Search
CPC ....................................................... G06F 17/30
USPC ....................................................... 707/723
See application file for complete search history.

(56) References Cited

U.S. PATENT DOCUMENTS

| | | | |
|---|---|---|---|
| 6,715,145 B1 | 3/2004 | Bowman-Amuah | |
| 6,957,227 B2 | 10/2005 | Fogel et al. | |
| 7,574,426 B1 | 8/2009 | Ortega | |
| 7,580,848 B2 | 8/2009 | Eder | |
| 7,752,195 B1 | 7/2010 | Hohwald et al. | |
| 7,890,451 B2 | 2/2011 | Cancel et al. | |
| 7,970,729 B2 | 6/2011 | Cozzi | |
| 8,561,012 B1 | 10/2013 | Holler et al. | |
| 9,262,451 B1 | 2/2016 | Singh et al. | |
| 9,384,226 B1 | 7/2016 | Goel et al. | |
| 9,465,825 B2 | 10/2016 | Nelke et al. | |
| 9,606,828 B2 | 3/2017 | Ghosh et al. | |
| 9,851,997 B2 | 12/2017 | Gough et al. | |
| 2001/0042062 A1 | 11/2001 | Tenev et al. | |
| 2004/0122646 A1 | 6/2004 | Colossi et al. | |
| 2005/0182739 A1 | 8/2005 | Dasu et al. | |
| 2007/0005383 A1 | 1/2007 | Kasower | |
| 2009/0018996 A1 | 1/2009 | Hunt et al. | |
| 2009/0282089 A1 | 11/2009 | Lakshnianachar et al. | |
| 2009/0327921 A1 | 12/2009 | Holm-Peterson et al. | |
| 2010/0030734 A1* | 2/2010 | Chunilal | G06F 17/30867 707/770 |
| 2010/0094685 A1 | 4/2010 | Young | |
| 2010/0153324 A1* | 6/2010 | Downs | G06F 17/2745 706/21 |
| 2011/0010100 A1* | 1/2011 | Li | G06F 19/18 702/19 |
| 2011/0055699 A1 | 3/2011 | Li et al. | |
| 2011/0078603 A1 | 3/2011 | Koomullil | |

(Continued)

OTHER PUBLICATIONS

U.S. Appl. No. 14/863,783 filed in the name of Stephen Todd et al. filed Sep. 24, 2015 and entitled "Unstructured Data Valuation."

(Continued)

*Primary Examiner* — Kim T Nguyen
(74) *Attorney, Agent, or Firm* — Ryan, Mason & Lewis, LLP

(57) ABSTRACT

A data set is obtained. A set of data relevance scores is calculated for the data set for a set of specific domains associated with an entity. The set of data relevance scores is updated as the relevance of the data set to one or more of the set of specific domains changes over time. A valuation is calculated for the data set based on the set of data relevance scores.

20 Claims, 10 Drawing Sheets

(56) References Cited

U.S. PATENT DOCUMENTS

| | | |
|---|---|---|
| 2012/0084261 A1 | 4/2012 | Parab |
| 2012/0116911 A1 | 5/2012 | Irving et al. |
| 2012/0123994 A1 | 5/2012 | Lowry et al. |
| 2012/0310684 A1 | 12/2012 | Carter |
| 2012/0323843 A1 | 12/2012 | Bice et al. |
| 2013/0036091 A1 | 2/2013 | Provenzano et al. |
| 2013/0055042 A1 | 2/2013 | Ai Za'noun et al. |
| 2013/0073594 A1 | 3/2013 | Jugulum et al. |
| 2013/0110842 A1 | 5/2013 | Donneau-Golencer et al. |
| 2013/0151423 A1 | 6/2013 | Schmidt et al. |
| 2014/0052489 A1 | 2/2014 | Prieto |
| 2014/0324856 A1 | 10/2014 | Lahiani et al. |
| 2015/0120555 A1 | 4/2015 | Jung et al. |
| 2015/0134591 A1 | 5/2015 | Staeben et al. |
| 2015/0293974 A1 | 10/2015 | Loo |
| 2016/0055184 A1 | 2/2016 | Fokoue-Nkoutche et al. |
| 2016/0110819 A1 | 4/2016 | Abramowitz |
| 2016/0132608 A1* | 5/2016 | Rathod ............. G06F 17/30867 707/722 |
| 2016/0196311 A1 | 7/2016 | Wang et al. |
| 2016/0217490 A1* | 7/2016 | Malik ................ G06Q 30/0247 |
| 2016/0224430 A1 | 8/2016 | Long et al. |
| 2017/0116345 A1* | 4/2017 | Cameron .......... G06F 17/30377 |
| 2017/0236060 A1 | 8/2017 | Ignatyev |
| 2017/0293655 A1 | 10/2017 | Ananthanarayanan et al. |

OTHER PUBLICATIONS

U.S. Appl. No. 14/998,112 filed in the name of Stephen Todd et al. filed Dec. 24, 2015 and entitled "Data Valuation Based on Development and Deployment Velocity."

U.S. Appl. No. 14/973,096 filed in the name of Stephen Todd et al. filed Dec. 17, 2015 and entitled "Data Set Valuation for Service Providers."

U.S. Appl. No. 14/973,141 filed in the name of Stephen Todd et al. filed Dec. 17, 2015 and entitled "Automated Data Set Valuation and Protection."

U.S. Appl. No. 14/973,178 filed in the name of Stephen Todd filed Dec. 17, 2015 and entitled "Timeliness Metrics and Data Valuation in Distributed Storage Systems."

U.S. Appl. No. 15/073,741 filed in the name of Stephen Todd et al. filed Mar. 18, 2016 and entitled "Data Quality Computation for Use in Data Set Valuation."

U.S. Appl. No. 15/072,557 filed in the name of Stephen Todd et al. filed Mar. 17, 2016 and entitled "Metadata-Based Data Valuation."

U.S. Appl. No. 15/136,327 filed in the name of Stephen Todd et al. filed Apr. 22, 2016 and entitled "Calculating Data Value via Data Protection Analytics."

U.S. Appl. No. 15/135,790 filed in the name of Stephen Todd et al. filed Apr. 22, 2016 and entitled "Data Valuation at Content Ingest."

U.S. Appl. No. 15/135,817 filed in the name of Stephen Todd et al. filed Apr. 22, 2016 and entitled "Data Value Structures."

U.S. Appl. No. 13/923,791 filed in the name of Stephen Todd et al. filed Jun. 21, 2013 and entitled "Data Analytics Computing Resource Provisioning."

U.S. Appl. No. 14/744,886 filed in the name of Marina Zeldin et al. filed Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forumitopics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

\* cited by examiner

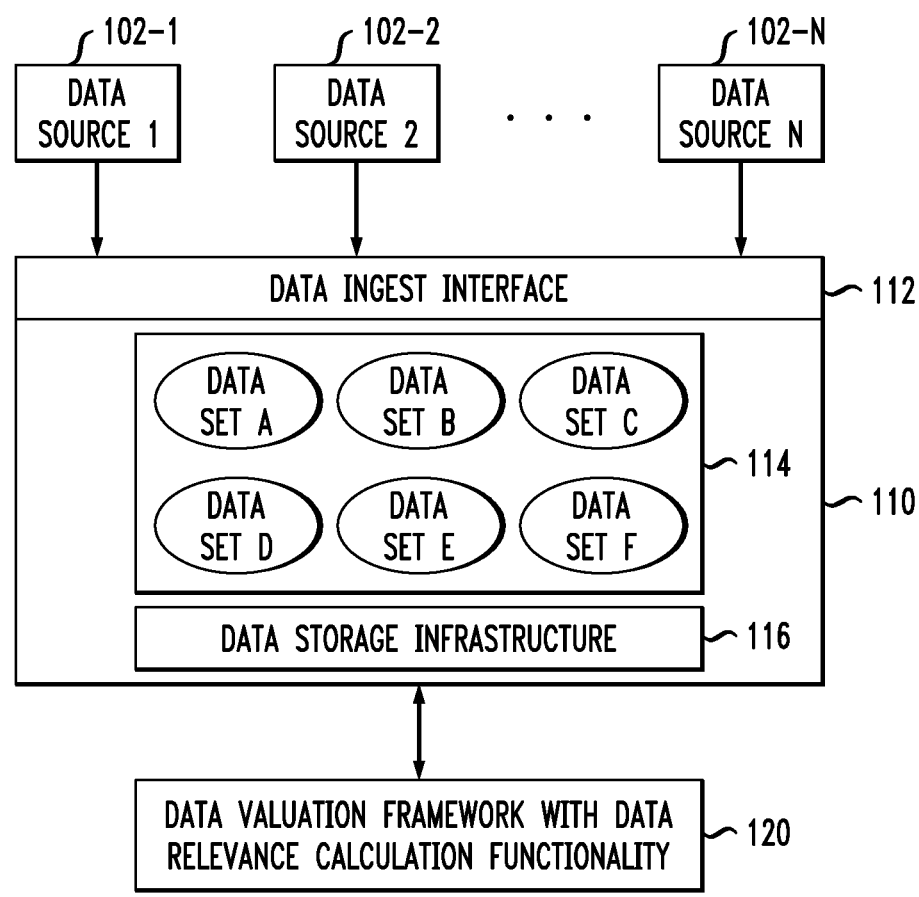

200

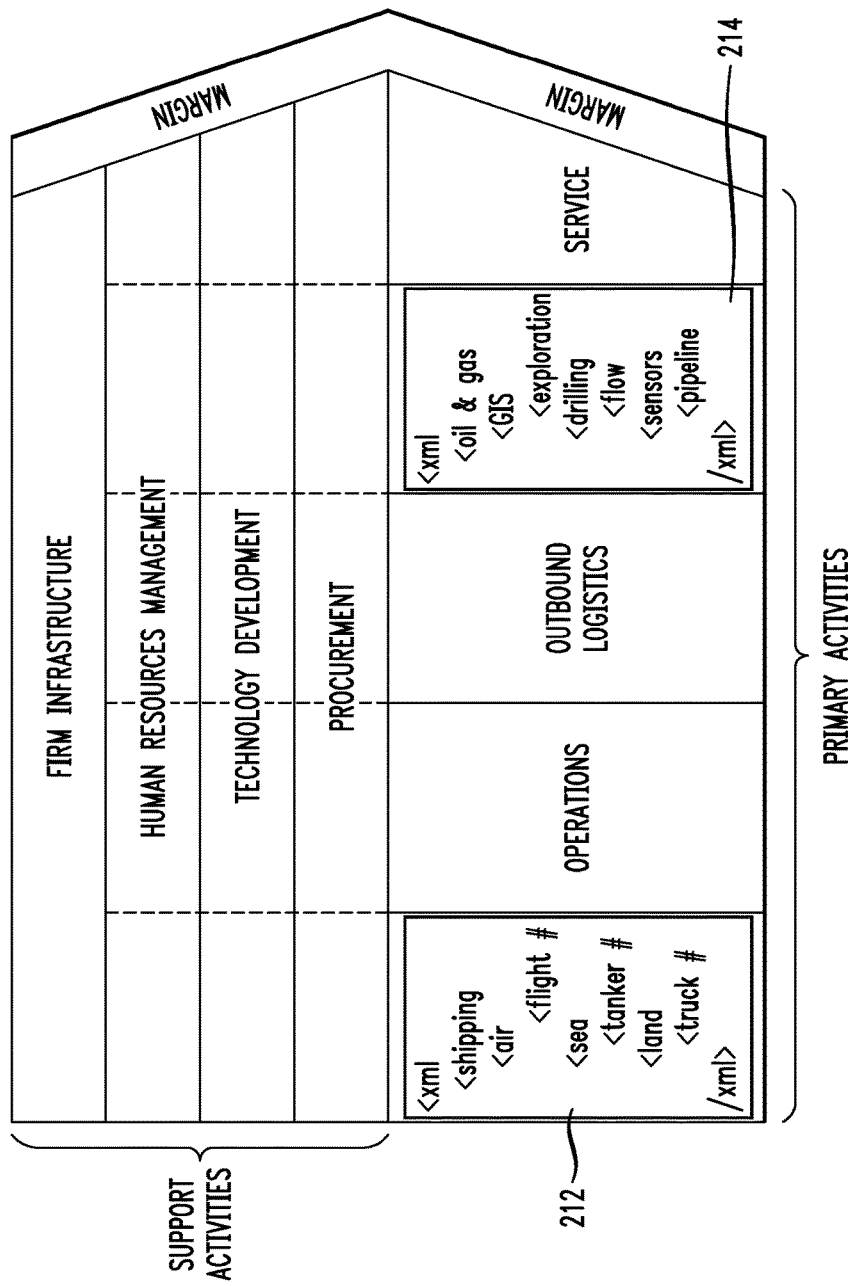

300

400

| DOMAIN | RELEVANCE (d) |
|---|---|
| INBOUND LOGISTICS | 0 |
| OPERATIONS | 0 |
| OUTBOUND LOGISTICS | 0 |
| MARKETING & SALES | 0.7 |
| SERVICE | 0 |

500

600

| DOMAIN | RELEVANCE (d)(t) | RELEVANCE (d)(t1) |
|---|---|---|
| INBOUND LOGISTICS | 0 | 0.4 |
| OPERATIONS | 0 | 0 |
| OUTBOUND LOGISTICS | 0 | 0 |
| MARKETING & SALES | 0.7 | 0.7 |
| SERVICE | 0 | 0 |

700

800

| DOMAIN | RELEVANCE (d)(t) | RELEVANCE (d)(t1) | RELEVANCE (d)(t2) |
|---|---|---|---|
| INBOUND LOGISTICS | 0 | 0.4 | 0.4 |
| OPERATIONS | 0 | 0 | 0 |
| OUTBOUND LOGISTICS | 0 | 0 | 0.3 |
| MARKETING & SALES | 0.7 | 0.7 | 0.7 |
| SERVICE | 0 | 0 | 0 |

900

1000

| DOMAIN | RELEVANCE (d)(t) | RELEVANCE (d)(t1) | RELEVANCE (d)(t2) | RELEVANCE (d)(t3) |
|---|---|---|---|---|
| INBOUND LOGISTICS | 0 | 0.4 | 0.4 | 0.4 |
| OPERATIONS | 0 | 0 | 0 | 0.2 |
| OUTBOUND LOGISTICS | 0 | 0 | 0.3 | 0.3 |
| MARKETING & SALES | 0.7 | 0.7 | 0.7 | 0.7 |
| SERVICE | 0 | 0 | 0 | 0 |

1100

CALCULATING DATA RELEVANCE FOR VALUATION

FIELD

The field relates generally to data processing and, more particularly, to data set valuation techniques.

BACKGROUND

Valuation algorithms allow owners of content to associate economic or business value to their data assets. This value can then potentially be used as input to a variety of business functions.

By way of one example only, one business function includes insuring data assets against loss. Insuring valuable data against loss (e.g., breach or corruption) has become an important part of risk management for entities that store and/or manage data for clients. Since client data is typically stored in cloud computing platforms, and thus susceptible to online breach by identity thieves and other actors involved in illicit activities, insuring the heavy financial risk faced by an entity that maintains client data has become a necessity. The value placed on a data asset determines the cost of insuring the data. Of course, valuation of data assets of an entity can be useful in many other business functions.

In each case, typically, the value of the data is connected, at least in part, to the relevance of the data to the entity. However, determining data relevance can be a complex matter for an entity. Accordingly, it is realized that techniques for determining accurate relevance are important.

SUMMARY

Embodiments of the invention provide automated data valuation techniques using data relevance calculations.

For example, in one embodiment, a method performed by one or more processing devices comprises the following steps. A data set is obtained. A set of data relevance scores is calculated for the data set for a set of specific domains associated with an entity. The set of data relevance scores is updated as the relevance of the data set to one or more of the set of specific domains changes over time. A valuation is calculated for the data set based on the set of data relevance scores.

Advantageously, illustrative embodiments provide techniques for determining data relevance (and data valuation) for a given data set as the data set changes over time, and for various business functions or processes (more generally, domains) of a given business. Further, illustrative embodiments can track relevance for the data set as the domains change over time.

These and other features and advantages of the invention will become more readily apparent from the accompanying drawings and the following detailed description.

BRIEF DESCRIPTION OF THE DRAWINGS

FIG. 1 illustrates a data storage system environment with data relevance calculation functionality, according to an embodiment of the invention.

FIG. 2B illustrates a data value chain with taxonomy mappings, according to an embodiment of the invention.

DETAILED DESCRIPTION

Figure 2A:
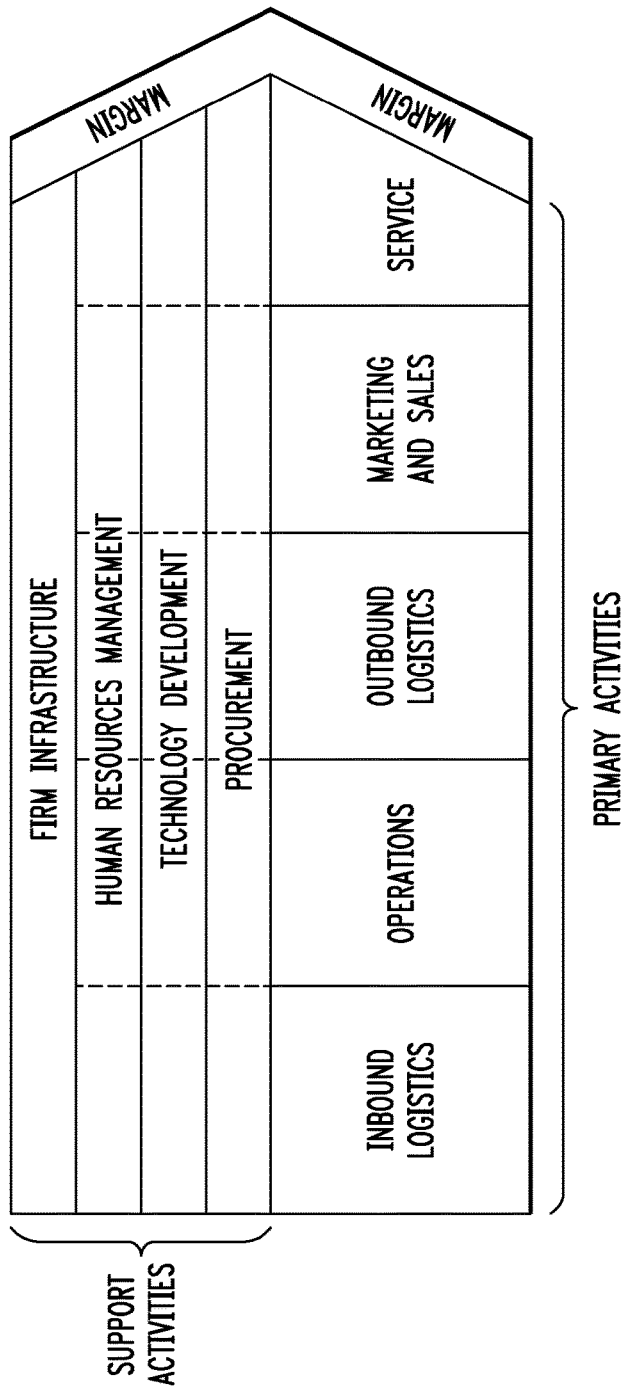
FIG. 2A illustrates a data value chain with which an embodiment of the invention is implemented.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"client" illustratively refers to a customer or end user of a data storage system or some other form of cloud computing platform; the client accesses the platform via one or more client processing devices;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.; and "metadata" illustratively refers to data that describes other data.

FIG. 1 illustrates a data storage system environment in which data relevance calculation embodiments of the invention can be implemented. As shown, in data storage system environment 100 (which may be implemented as a cloud computing platform in an illustrative embodiment), data sources 102-1, 102-2, . . . , 102-N provide data to data storage system 110 through a data ingest interface 112. In illustrative embodiments, one or more of the data sources 102-1, 102-2, . . . , 102-N may provide streaming data (i.e., data streams). The data storage system 110 comprises a plurality of data sets 114 (data sets A-F) that are stored on data storage infrastructure 116. The data sets 114 comprise the data from the data sources 102 (e.g., data files), but can also include other data. The data sets 114 may each have their own domain-specific data (e.g., customer data, employment data, credit data, etc.) corresponding to one or more of data sources 102-1, 102-2, . . . , 102-N. Data storage infrastructure 116 may comprise one or more compute elements (e.g., servers), network elements (e.g., switches, routers) and/or storage elements (e.g., storage devices, storage arrays). Data storage system 110 can be part of a data center managed by a service provider.

The value of data, such as the data from data sources 102-1, 102-2, . . . , 102-N stored as data sets 114, is calculated by data valuation framework 120. As will be explained in detail, illustrative embodiments calculate data relevance metrics for the data sets 114 and utilize these metrics to value the data.

Thus, data relevance is identified herein as one attribute of data value. In an illustrative business context, data relevance may be a function of how many different business functions rely on this data. For example, if a business value chain is made up of different general functions (e.g., marketing & sales, services, inbound logistics, outbound logistics, and operations), it is realized herein that it is advantageous to determine how relevant a given data set is to all of the different functions. Illustrative embodiments provide techniques that solve the difficult problem of calculating the relevance of any given data set to the many different functions for which the data set is used (e.g., in the case of a business context, the relevance of the data set to the different functions within a business).

By way of one non-limiting example, one or more of the data valuation models described in D. Laney, "The Economics of Information Assets," The Center for Infonomics, Smarter Companies presentation, September 2011, may be employed as data valuation methodologies used by framework 120. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

With specific reference to the business value of information model, it is realized herein that determining the relevance of the data to corporate business processes is a challenging task. The business value of information (BVI) model is computed as:

$$BVI = \sum_{p=1}^{n} (Relevance_p) * Validity * Completeness * Timeliness$$

where "n" is the number of business processes or functions and relevance represents "how useful the information could be (or is) to one or more business processes (on a scale of 0 to 1). However, it is realized herein that the business relevance referred to in the above model is a highly subjective due, at least in part, to a lack of association between stored data and actual business functions.

More specifically, the above model calculation sums "p" from 1, . . . , n, where "n" is the number of business functions that the data set is compared against for relevance. There are no existing mechanisms to determine relevance to all "n" business functions.

"Dark data" has been defined as the information assets organizations collect, process, and store during regular business activities, but generally fail to use for other purposes (for example, analytics, business relationships, and direct monetizing). Organizations often have no method of calculating the potential relevance of that data to other areas of their business.

Relevance calculations against existing data assets often require a full-text analysis of these data assets (e.g., depending on the size). This can result in a retrieval delay when the business desires to know the current relevance of a particular data asset. There is no existing mechanism to dynamically calculate data relevance against all "n" business categories as new data flows into an existing data asset.

The relevance of an existing data asset can change or fluctuate in static, unchanging form. This can occur based any number of different business events (e.g., discontinuing a product line) or world events (e.g., a nation lowers oil production). There are currently no existing mechanisms for dynamically modifying relevance as a result of changing business circumstances.

Even if data relevance were to be calculated for specific data assets, there are no existing methods for plugging relevance values into an overall valuation framework.

There are no existing methods to monitor the fluctuation in data relevance of a given data asset over time, nor is there any existing mechanism for understanding the reason for the fluctuation.

Illustrative embodiments leverage valuation measurement techniques with domain specific taxonomies to create accurate data relevance scores. Such techniques are considered "data relevance calculation functionality" (or data relevance calculation methodology) and are integrated, as will be explained herein, in the data valuation framework 120 of FIG. 1.

Thus, a first step of the data relevance calculation methodology is for corporations (i.e., entities with data sets to be valued) to maintain domain specific taxonomies that represent all aspects of their business.

FIG. 2A illustrates a data value chain, according to an embodiment of the invention. The data value chain 200 in FIG. 2A is called a Porter's value chain as described in M. E. Porter, "Competitive Advantage: Creating and Sustaining Superior Performance," Simon and Schuster, 1985. As described therein and illustrated in FIG. 2A, data value chain 200 includes primary activities and support activities. The goal of these activities is to offer the customer a level of value that exceeds the cost of the activities, thereby resulting in a profit margin. Primary activities include and are defined as:

Inbound Logistics: the process of arranging the inbound movement of materials, parts, and/or finished inventory from suppliers to manufacturing or assembly plants, warehouses, or retail stores.

Operations: the process of managing the process that converts inputs (in the forms of raw materials, labor, and energy) into outputs (in the form of goods and/or services).

Outbound Logistics: the process of storing and moving the final product and the related information flows from the end of the production line to the end user.

Marketing and Sales: the process of selling a product or service and processes for creating, communicating, delivering, and exchanging offerings that have value for customers, clients, partners, and society at large.

Service: the processes to keep the product/service working effectively for the buyer after it is sold and delivered.

Support activities include and are defined as:

Procurement: the process of acquisition of goods, services or works from an outside external source.

Human Resources Management: the processes of recruiting, hiring, training, developing, compensating and (if necessary) dismissing or laying off personnel.

Technology Development: pertains to the equipment, hardware, software, procedures and technical knowledge brought to bear in the firm's transformation of inputs into outputs.

Firm Infrastructure: the processes of accounting, legal, finance, control, public relations, quality assurance and general (strategic) management.

As part of building a data relevance solution according to illustrative embodiments, a business builds a set of domain specific taxonomies (e.g., an Extensible Markup Language (XML) file) that are relevant to a specific set of the business (e.g., a list of keywords that are relevant to a vertical industry such as oil and gas). This taxonomy can be mapped, for example, to different areas of the business value chain.

FIG. 2B illustrates taxonomy mappings to the data value chain of FIG. 2A. More particularly, data value chain 210 (which corresponds to data value chain 200) is shown with two of the primary activities (or domains) having domain-specific taxonomies assigned thereto for an oil and gas business entity. Thus, taxonomy 212 is assigned to the inbound logistics domain. Note the keywords of "shipping," "air," "flight #," "sea," "tanker #," "land," "truck #" that constitute the XML taxonomy 212 for the inbound logistics domain. Similarly, taxonomy 214 is assigned to the marketing & sales domain. Note the keywords of "oil & gas," "GIS," "exploration," "drilling," "flow," "sensors," "pipeline" that constitute the XML taxonomy 214 for the marketing & sales domain.

Thus, for an oil and gas business, terms related to geological data and/or drilling operations may determine what kind of yield an oil field can provide (and therefore how much money can be made). For the inbound shipment of products to the company, other words related to shipping can be mapped to the inbound logistics domain. The taxonomies in FIG. 2B is merely intended to be non-limiting examples.

These domain-specific taxonomies can then be filled out for every area of the business value chain (e.g., n=5 for the five primary activities). Alternatively, if multiple taxonomies are created for one area of the business value chain (e.g., assume an additional "healthcare" taxonomy is created for the marketing and sales domain), then "n" can be set to the number of overall relevant taxonomies generated by the business.

Once a set of domain-specific taxonomies that are relevant to the business is created, the data relevance calculation methodology uses one or more specific valuation techniques to compare the content within a data set to each business domain. One technique that can be used when the data set is unstructured data is a tokenization and annotation approach. The approach is summarized in FIG. 3. As shown in methodology 300, incoming content is obtained. The incoming data can be any unstructured data set, by way of example, a document (record, file, etc.). The document can be text or include text with other media (multimedia).

In step 302, text extraction is performed on the document. Text extraction (also more broadly called "information extraction") is the task of automatically extracting information from unstructured (and/or semi-structured) machine-readable documents. In most cases, this task involves processing human language texts using natural language processing (NLP). However, in multimedia documents, processing such as automatic annotation and content extraction from images/audio/video can also be considered text/information extraction.

In step 304, language identification is performed on the extracted text. In NLP, language identification is the task of determining which natural language given content is in. There are several conventional statistical approaches using different techniques to classify the data that can be employed to perform language identification.

Once the language of the extracted text is identified, linguistic analysis or tokenization is performed in step 306. Tokenization is an NLP technique that generates tokens from the extracted text using processes such as stemming and lemmatization. A main goal of stemming and lemmatization is to reduce inflectional forms and derivationally related forms of a word to a common base form. For example, different forms of a word may be used in a document, e.g., processes, processed, processing. Likewise, different derivations of words may be used in a document, e.g., memorial, memorize, memorization. In many situations, it would be useful for a search for one of these words to return documents that contain another word in the set.

Accordingly, stemming is a process that removes (chops off or stems) the ends (or some part) of words in order to obtain the common base form. Lemmatization is a process of performing a vocabulary and morphological analysis of words, normally seeking to remove inflectional endings only and to return the base or dictionary form of a word, which is known as the lemma. Thus, the stemming and lemmatization processes result in tokens that are the common base forms of words from the extracted text. For the example sets of words above, returned tokens may respectively be process and memori. Note that the language of the text is important to be identified (from step 304) since knowledge of the language, and thus language-specific rules, serves to instruct the tokenization method (step 306) on how to chop a word, as well as on vocabulary and morphological rules for the specific language. Some well-known tokenization methods (also known as stemmer algorithms) include the Porter stemmer algorithm, the Lovins stemmer algorithm, and the Paice stemmer algorithm. One or more of these algorithms, as well as alternative tokenization methods, can be employed as part of step 306.

Next in methodology 300, the tokens returned in step 306 for the given document are annotated in a domain-specific manner in step 308. Text annotation tools are known to classify words based on some criterion. In illustrative embodiments, a text annotation tool is adapted to assign (tag or map) each token to a domain-specific taxonomy. More specifically, the text annotation tool compares these tokens against the "n" taxonomies created by the business. This attaches a given token to one or more relevant business domains. The domain-specific taxonomies can be the taxonomies assigned to the data value chain 210 in FIG. 2B. In alternative embodiments, a training set of documents for a specific domain and a set of vectorized tokens may be used. By way of example only, the token process could be annotated as "legal" (as in service of process) and/or as "finance" (as in a fiscal compliance process). In any case, each token returned in step 306 is annotated and mapped to at least one domain in step 308 to return domain aware tokens in step 310. These annotated tokens can be stored, for example, as a cached version for the given document (data set) that eliminates the need to re-parse the content upon receipt of the document again at a later time.

Using the techniques above, a given data asset now has a list of business domains to which it maps. A scoring process is then performed that is consistent with, for example, the BVI model shown above. A sample scoring algorithm is described below:
For each "p" in domain "n"
    For each token "t" in document "d"
        If "t" maps to "p"
            Increase the relevance of "d" to "p"

In the case of the equation for BVI, the relevance of a given document "d" will be "0" if there are no tokens that apply to a given business process, and "1" if the document is of the highest relevance.

The scoring algorithm above is just one example. Higher or lower scores can be given based on other factors as well, for example only, observing the distance between two tokens in a document may alter the score.

Figures 3, 4:
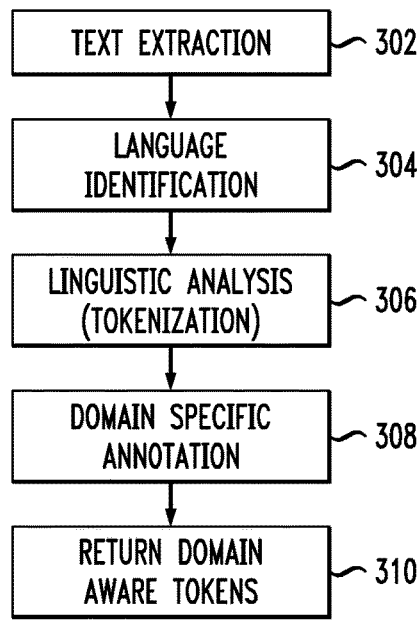
FIG. 3 illustrates a data valuation methodology for unstructured data that can be employed with embodiments of the invention.
FIG. 4 illustrates a first example of a data relevance scoring table, according to an embodiment of the invention.

FIG. 4 illustrates a first example of a data relevance scoring table, according to an embodiment of the invention. Table 400 assumes that a document (Document "d") contains occurrences of the tokens "drilling" and "GIS," e.g., keywords from taxonomy 214 corresponding to the marketing & sales domain, and as such, results in a relevance score of 0.7 for the marketing & sales domain and a relevance score of 0 for all other domains.

The use of tokenization to calculate relevance can be augmented by leveraging metadata found in the data protection ecosystem of a data storage system environment. Not specifically shown in the data storage system environment 100 in FIG. 1 is a data protection ecosystem used for backup and data protection of the primary data storage in FIG. 1. Illustrative embodiments realize that a data protection ecosystem comprising metadata can assist in data relevance determinations.

More particularly, a data protection ecosystem illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients. Backup data, metadata, and analytics results are obtained during the course of the data protection ecosystem providing data backup and recovery functionalities for the primary storage environment.

Figure 5:
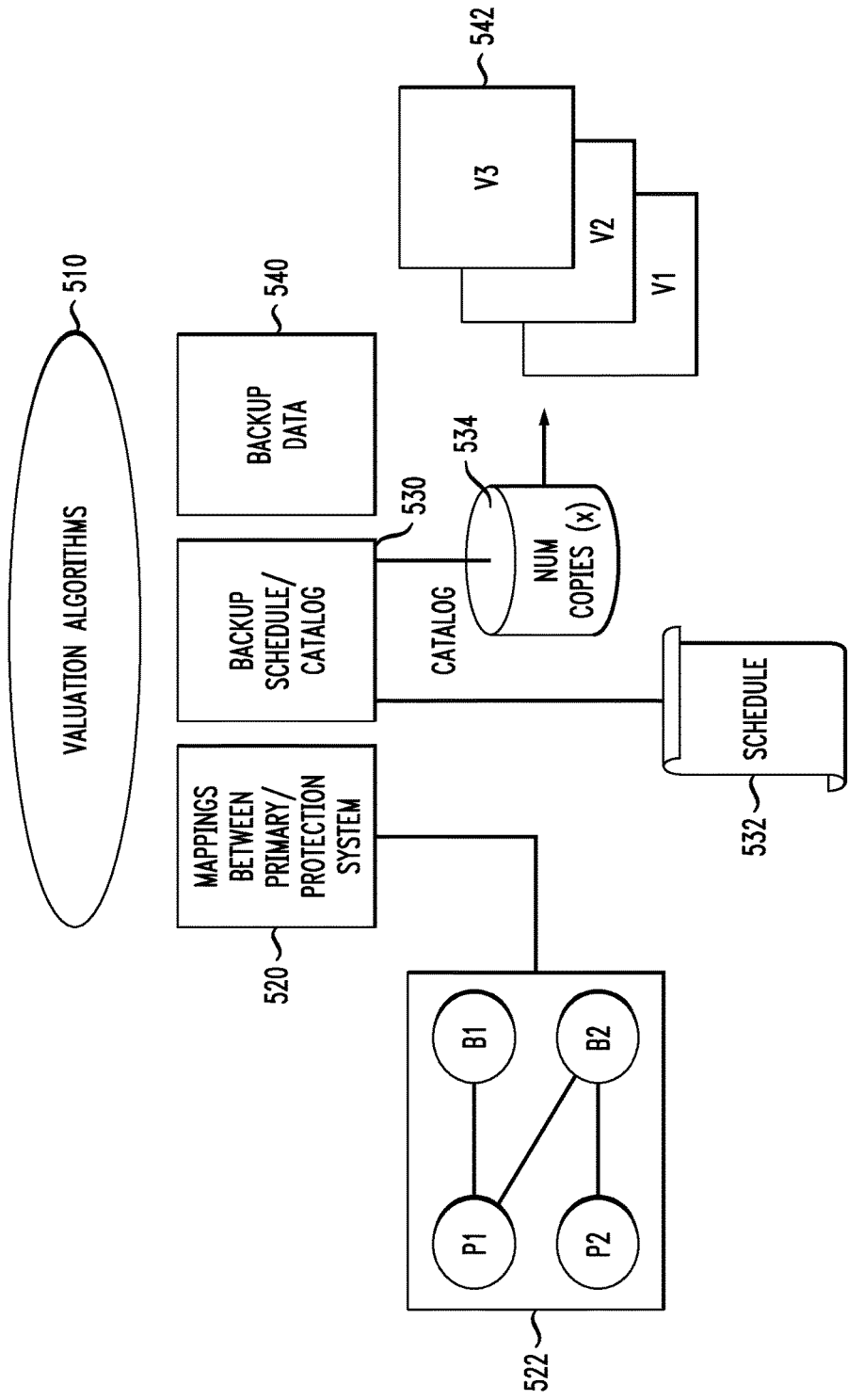
FIG. 5 illustrates a system for data valuation utilizing a data protection ecosystem according to an embodiment of the invention.

FIG. 5 illustrates a system 500 for data valuation utilizing a data protection ecosystem according to an embodiment of the invention. The system 500 leverages data, metadata, and/or analytics results from a data protection ecosystem. As shown, one or more valuation algorithms 510 receive information from one or more of the following logical objects: primary-to-protection system mappings 520 (illustrated by mapping 522); backup schedule/catalog 530 (illustrated by schedule 532 and catalog 534); and backup data 540 (illustrated by backup data sets, objects, files 542), that are part of a data protection ecosystem. It is to be appreciated that the logical objects shown in FIG. 5 are only examples of aspects and features of the data protection ecosystem that can be utilized to value data. Any other backup and recovery objects, not expressly shown, can also be employed.

As shown, the mappings 520 of primary systems (e.g., P1 and P2) to backup systems (e.g., B1 and B2) are depicted as a graph 522 (which may be stored as a file). By "system" here it is meant a storage subsystem (e.g., device, array, etc.) of the overall data storage system. Thus, for example, storage array B2 may serve as backup for storage arrays P1 and P2, while storage array B1 serves as a further backup for storage array P1. The backup schedule 532 (e.g., how often backup operations are performed and details about the operations) and catalog 534 (e.g., descriptive data representing lookup information such as the number and location of snapshot copies or backup data for each primary data set or object) likewise can be implemented as databases, as well as the actual backup data 542 (e.g., data sets or data objects V1, V2, and V3). One or more valuation algorithms 510 that valuate the versioned data and metadata represented in FIG. 5 are executed separately from the production systems (e.g., P1, P2). This solves the problem of placing a load on the primary systems when executing valuation algorithms. Examples of the one or more valuation algorithms 510 may include but are not limited to assigning scores from predetermined score ranges to the various logical objects that make up the data protection system. Furthermore, one or more of the above-mentioned data valuation models may serve as the one or more valuation algorithms 510. One ordinarily skilled in the art will realize other types of valuation algorithms that can be employed given the inventive teachings provided herein.

The creation of backup copies of production data provides the opportunity for data engineers to perform conditioning and cleaning operations on data (e.g., data V3 in 542). Should the cleaning operations effectively increase the value of the data (as indicated by the valuation algorithms), these results can be folded back or otherwise imported back into the production copies.

One of the benefits of running data valuation algorithms against a backup and recovery repository is the fact that these repositories have the capability to track the lineage or provenance of a file or data set. For example, files V1, V2, and V3 can represent successive versions of the same file. By running one or more valuation algorithms 510 across all three versions, it is possible to observe fluctuations in value (either positively or negatively), and zero in on the exact changes that caused the shift in value. This is less easy to do (or impossible) in a production environment.

In addition to the value of file content, the investment level from an infrastructure perspective can also be used to determine a different dimension of value. Using the example above, one or more valuation algorithms 510 can determine: (a) what type of primary storage system does the data reside on (e.g., P1 and P2); (b) what type of pipe (e.g., fast, slow, etc.) is used for the connectivity to the backup systems; and (c) the nature of the backup systems (e.g., B1 and B2); and (d) how many copies are currently active for that primary data set. All of this information adds up to a specific level of investment being made by the IT infrastructure, and this value can be more accurately determined by using the above-described valuation techniques.

Still further, use of the data protection ecosystem to calculate data relevance provides the following benefits:

1. Tokenization can be performed on copies (if desired), removing load from the production system.
2. Backup copies are easily mapped to applications, and these applications can be mapped to business functions (e.g., different areas of the business value chain).
3. The permissions (who can restore) from backup copies often identify stakeholders who access the data. These users can likewise be mapped to different business functions (an alternative way to calculate relevance).
4. Backup copies that are mounted and accessed by secondary/tertiary applications (e.g., analytics applications) have a higher data relevance. This scenario can be detected and result in the increase of a data relevance score.
5. Versioned copies provide an opportunity to calculate versioned relevance over time, as will be further explained below.

Relevance scoring can be executed against a production data set or the data protection ecosystem. This approach calculates the relevance of the data (e.g., by using domain-aware tokenization), timestamps the result, and then creates "chains" of data relevance calculations over time. Illustrative embodiments leverage the data protection ecosystem because the processing occurs outside of the production environment and the algorithms have access to multiple versions over time. Additionally, the calculation of versioned relevance can also be tied to a backup schedule.

Figures 6, 7:
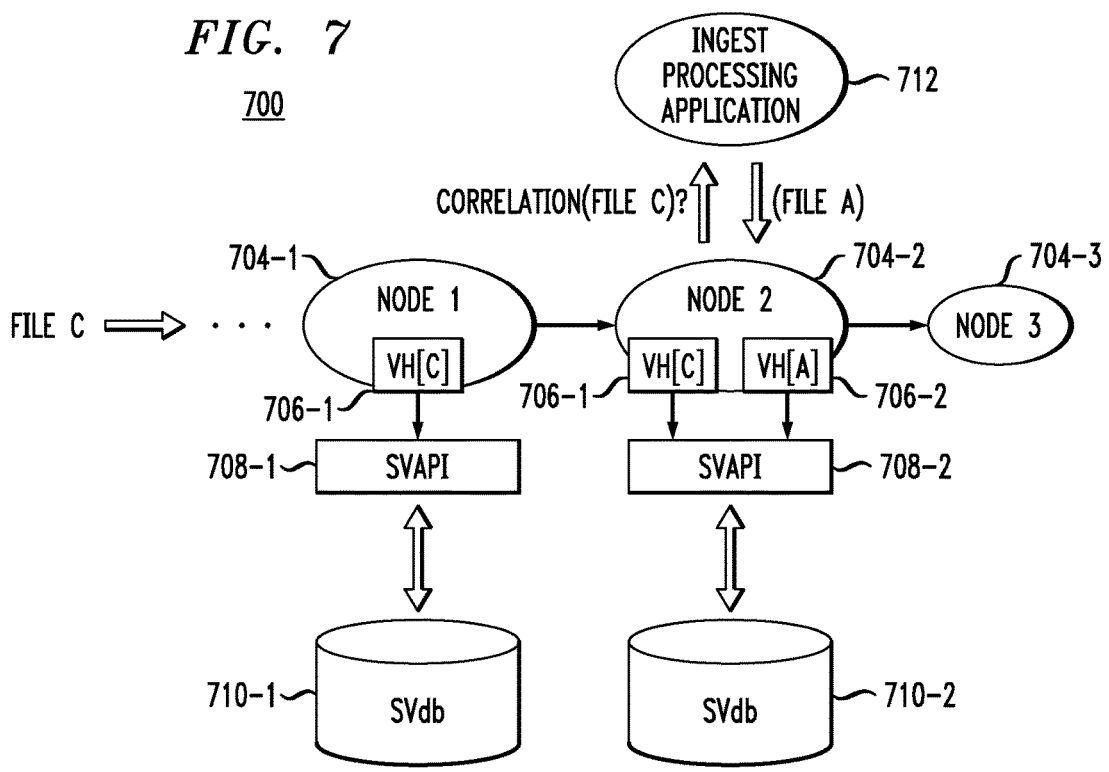
FIG. 6 illustrates a second example of a data relevance scoring table, according to an embodiment of the invention.
FIG. 7 illustrates a data correlation valuation framework according to an embodiment of the invention.

FIG. 6 illustrates a second example of a data relevance scoring table. In this example, the data relevance calculation methodology takes advantage of the data protection ecosystem maintaining multiple versions of a given document. Table 600 assumes that the document describing oil and gas drilling status (same document "d" referenced in FIG. 4 example) is augmented with the status of an oil shipment arriving onshore. As illustrated, this difference in the document changes the data relevance against one element of the business value chain (i.e., inbound logistics) but not another (i.e., marketing and sales). That is, table 600 assumes that the updated document contains occurrences of the tokens "shipping" and "tanker #," e.g., keywords from taxonomy 212 corresponding to the inbound logistics domain, and as such, at a time t1, results in a relevance score of 0.4 for the inbound logistics domain, while the relevance scores for all other domains remain the same. This approach also allows for graphs to be drawn that track the relevance of data to multiple domains at different times, as will be illustrated below in the context of FIG. 13.

The approach of performing relevance calculations on stored production data and/or protection data may potentially generate "stale" relevance scores for data assets that change frequently. As such, FIG. 7 illustrates a relevance scoring on ingest architecture. By way of one non-limiting example, the processing framework 700 may be implemented using an Apache™ Storm framework (available from the Apache Software Foundation, Los Angeles, Calif.). In such an implementation, data sources are referred to as "spouts" and processing nodes are referred to as "bolts." The framework 700 is used to process a data asset (e.g., a file, or changes to a file). The processing nodes (bolts) can perform processing and/or transformation before forwarding the data onto another processing node (bolt), and then ultimately to a storage repository.

As content flows into the ingest framework, a valuation handle can be created (or retrieved) and used by the processing nodes throughout the processing of the incoming content. This valuation handle or VH is a file handle representing the content being evaluated. As the content is received, the VH is provided to a streaming valuation application programming interface or SVAPI that performs a variety of functions. These functions will be described in more detail below. A streaming valuation database or SVdb is maintained to store ingest-related calculations. This database, in an illustrative embodiment, can be separate from the content store (i.e., the storage system that stores the incoming file). Note that each node can have its own SVAPI and SVdb or two or more nodes can share an SVAPI and/or SVdb. Also, in illustrative embodiments, the framework can have a single SVAPI and a single SVdb.

More particularly, as shown, a set of nodes 704-1, . . . , 704-3 receive file C (the source of file C is not expressly shown but understood to be coupled to node 704-1). One or more of the nodes are programmed to first perform a tokenization/annotation on file C. For example, node 704-1 performs this operation and calls SVAPI 708-1 with the valuation handle for C (VH[C] 706-1). The SVAPI 708-1 then executes the logic to calculate a new relevance score for file C and records it into SVdb 710-1. The domain-aware tokens could also be updated, and if desired the versioned relevance could be updated.

As execution passes to node 704-2, correlation logic of ingest processing application 712 (e.g., InfoArchive™ system available from EMC Corporation, Hopkinton, Mass.) is executed, resulting in the discovery that file A correlates to (has affinity to) file C. This causes the fetching of handles for both A (706-2) and C (706-1), and SVAPI 708-2 makes appropriate updates to the current values of A and C in SVdb 710-2 before passing the stream to node 704-3. Note that while separate instances of SVAPI and SVdb are shown in FIG. 7 for each of nodes 704-1 and 704-2, two or more nodes may share the same SVAPI and/or SVdb.

Figures 8, 9:
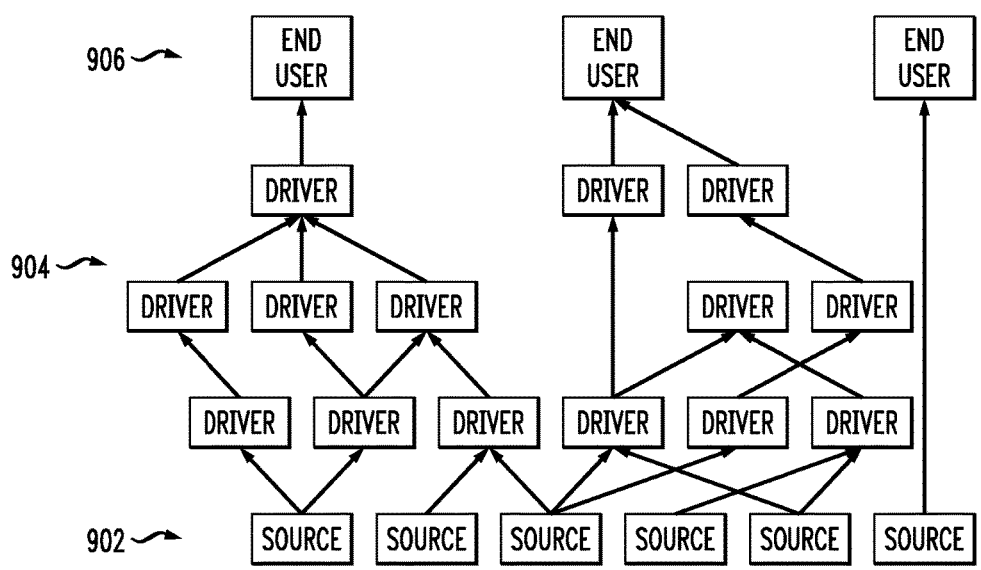
FIG. 8 illustrates a third example of a data relevance scoring table, according to an embodiment of the invention.
FIG. 9 illustrates end user valuation nodes in relation to driver valuation nodes and source valuation nodes, according to an embodiment of the invention.

That is, if file C has any sort of affinity or correlation to other documents, this could potentially increase the data relevance score. It is possible that file C may indirectly be relevant to other areas of the business even though the tokenization algorithms may not indicate this reality. For example, consider that file C is the equivalent of document (d) (used as the running example in table 400 of FIG. 4 and table 600 of FIG. 6). As this document streams into the system, the InfoArchive™ correlation algorithm(s) may discover that this document has strong affinity to a set of documents related to outbound logistics. This may cause an increase in the data relevance score for a time t2, as indicated by FIG. 8. That is, note that the relevance score in table 800 corresponding to outbound logistics is now 0.3, while the other relevance scores remain as they were from table 600.

Illustrative embodiments realize that data may change in relevance based on new uses within a business (e.g., as the data is explored, transformed, and analyzed by a data science team). FIG. 9 illustrates a hierarchical data structure 900 that comprises six data assets (located in the bottom row and collectively labeled "source" asset nodes 902).

Assume that each "source" data asset has already been assigned a relevance score. A set of data scientists can explore this data, perform analytics, and generate intermediate data sets (collectively labeled as "driver" nodes 904), and then finally results and recommendations can be generated to the business (collectively labeled as "end user" nodes 906).

These end user results (as well as the intermediate "driver" nodes) may also be given relevance scores (for example, based on a tokenization/annotation approach). By tracking the lineage from the sources up to the end user nodes, an underlying source asset may be found to have new relevance to a business unit that was previously thought to be irrelevant.

For example, perhaps a data science team at an oil and gas company used document (d) (document used in the running example) to generate an end user report for the operations team. The data science team end user report informed the operations team that a change in the routing of rig-to-shore and shore-to-refinery transportation could save the company a significant amount of money. The data that informed this decision, i.e., document (d), is now relevant to a different segment of the business (the operations team). This could result in a fourth relevance version at time t3, as depicted in table 1000 of FIG. 10, whereby the relevance score for document (d) for the operations domain is updated to 0.2, while the other scores remain the same.

Figures 10, 11:
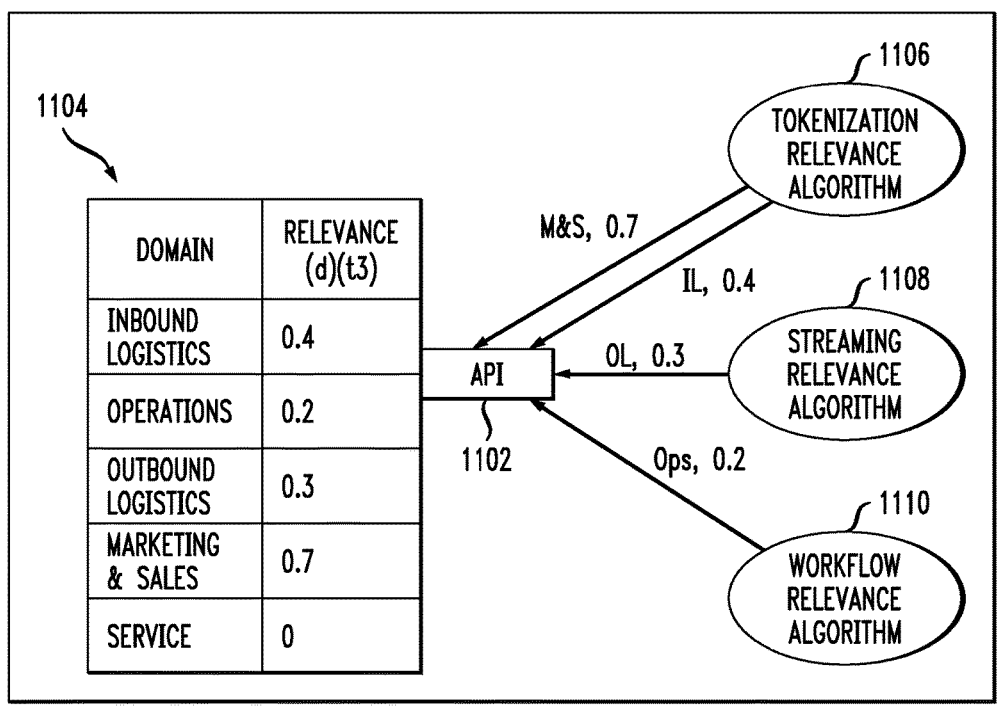
FIG. 10 illustrates a fourth example of a data relevance scoring table, according to an embodiment of the invention.
FIG. 11 illustrates an application programming interface for a data relevance scoring table, according to an embodiment of the invention.

These approaches for calculating relevance can be tied into a valuation framework that enables the overall valuation of data. FIG. 11 illustrates a system 1100 that uses a valuation application programming interface (API) 1102 to store different valuation variables into a valuation database 1104. One or more relevance algorithms, as described herein, can be used to generate the scores. For example, a tokenization relevance algorithm 1106 (FIG. 3) can provide relevance scores based on a tokenization/annotation approach. This same algorithm can also be run as part of the data protection ecosystem and assign a different relevance score based on the findings. Streaming relevance algorithm 1108 (FIG. 7) can provide data relevance scores calculated contemporaneous with data ingest. Workflow relevance algorithm 1110 (FIG. 9) can provide data relevance scores calculated as data is explored, transformed, and analyzed by a data science team.

Figure 12:
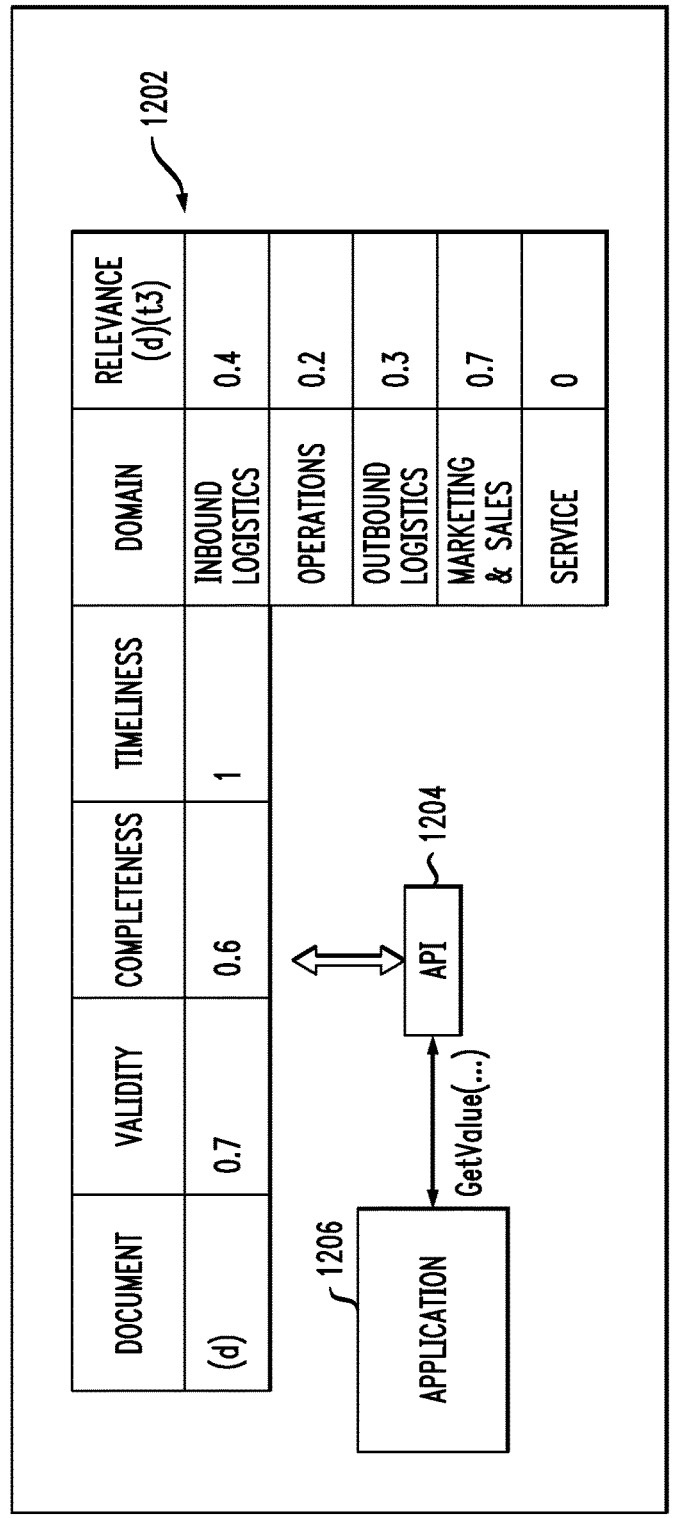
FIG. 12 illustrates an application use case for a data valuation framework with data relevance calculation functionality, according to an embodiment of the invention.

As shown in system 1200 in FIG. 12, this relevance database 1104 can be part of a larger valuation database 1202 that stores other valuation-related parameters (e.g. validity, completeness, and timeliness parameters from the BVI calculation mentioned above). System 1200 further illustrates a valuation use case wherein an application programming interface (API) 1204 is used by an application 1206 to obtain valuation data from database 1202. In one non-limiting example, the application 1206 could be associated with a data insurance company called in by a business to provide cyber-insurance on document (d), and which wishes to understand the current business value of the document.

It is to be appreciated that various advantages are realized from the valuation calculated for a given data set. By way of example only, the calculated valuation may be utilized for one or more business processes, for triggering one or more actions, for determining placement of the data set in the data storage system, etc. More generally, the data valuation framework 120 in FIG. 1 may be coupled over a communication network (e.g., Internet) to one or more other systems such that one or more messages are sent from the framework to the one or more other systems to effectuate some valuation-driven results (e.g., improve computer system operation, trigger business processes, data migration, etc.).

Figure 13:
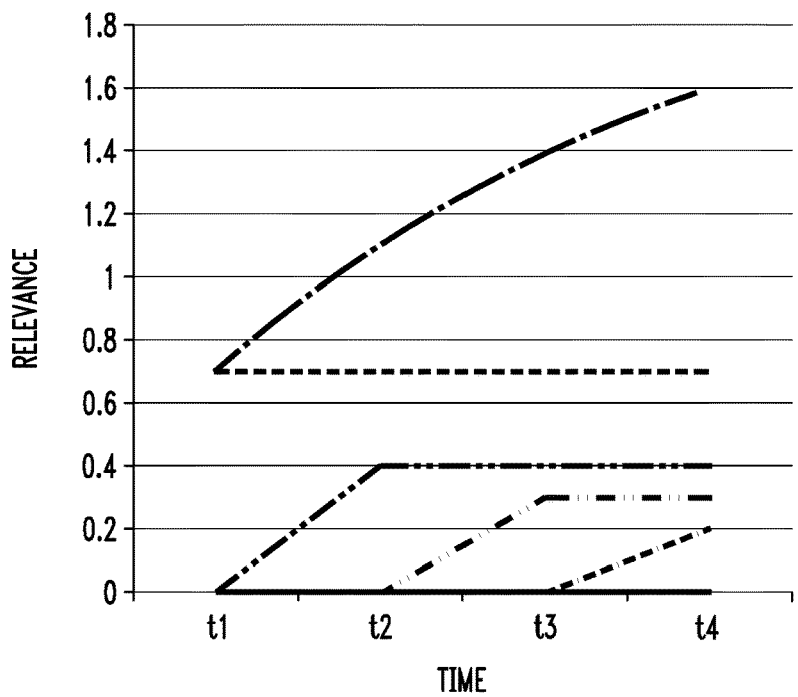
FIG. 13 illustrates a data relevance graph over time, according to an embodiment of the invention.

FIG. 13 illustrates a data relevance graph 1300 over time, according to an embodiment of the invention. That is, the methodologies described herein allow for the tracking of relevance over a period of time. Thus, when the relevance of a data set is calculated with respect to various business domains (primary activities from the data value chain 210 of FIG. 2B), the changes to the relevance scores can be plotted over time to yield a graphical representation illustrating the rise and fall of relevance. By way of example, in graph 1300, note how the relevance score for inbound logistics starts at 0 at time t1, rises to 0.4 at time t2, and remains at 0.4 through times t3 and t4. This graph, along with supporting relevance scoring tables, can be accessed and viewed via a graphical user interface by one or more users of the data valuation framework 120 (FIG. 1).

Figure 14:
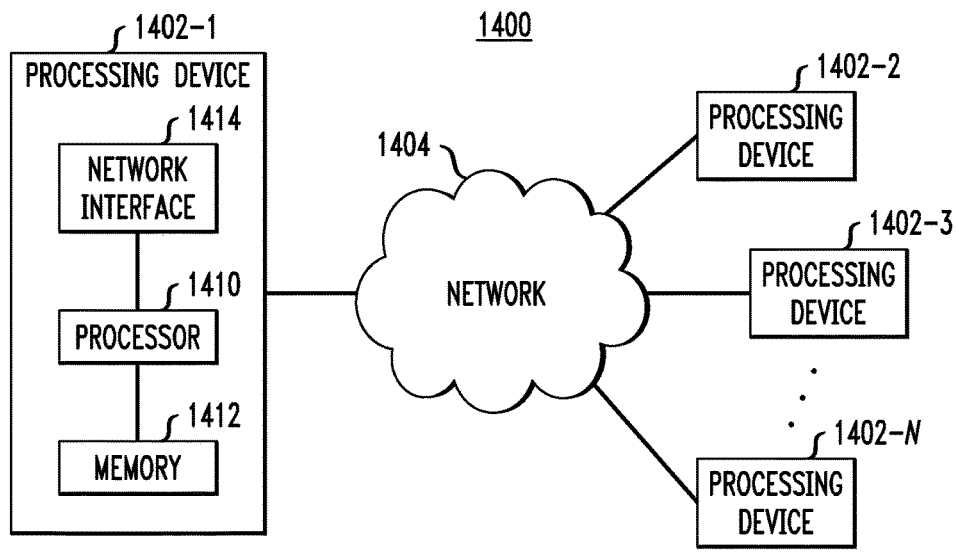
FIG. 14 illustrates a processing platform used to implement a data valuation framework with data relevance calculation functionality, according to an embodiment of the invention.

As an example of a processing platform on which a data storage and valuation framework environment (as shown in FIGS. 1-13) according to illustrative embodiments can be implemented is processing platform 1400 shown in FIG. 14. The processing platform 1400 in this embodiment comprises a plurality of processing devices, denoted 1402-1, 1402-2, 1402-3, ... 1402-N, which communicate with one another over a network 1404. It is to be appreciated that the data valuation methodologies described herein may be executed in one such processing device 1402, or executed in a distributed manner across two or more such processing devices 1402. Thus, the framework environment may be executed in a distributed manner across two or more such processing devices 1402. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 14, such a device comprises at least one processor and an associated memory, and implements one or more functional modules for instantiating and/or controlling features of systems and methodologies described herein. Multiple elements or modules may be implemented by a single processing device in a given embodiment.

The processing device 1402-1 in the processing platform 1400 comprises a processor 1410 coupled to a memory 1412. The processor 1410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1410. Memory 1412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1412 may comprise electronic memory such as random access memory (RAM), read-only memory (ROM) or other types of memory, in any combination. The one or more software programs when executed by a processing device, such as the processing device 1402-1, causes the device to perform functions associated with one or more of the components/steps of system/methodologies in FIGS. 1-13. One skilled in the art would be readily able to implement such software given the teachings provided herein. Other examples of processor-readable storage media embodying embodiments of the invention may include, for example, optical or magnetic disks.

Processing device 1402-1 also includes network interface circuitry 1414, which is used to interface the device with the network 1404 and other system components. Such circuitry may comprise conventional transceivers of a type well known in the art.

The other processing devices 1402 (1402-2, 1402-3, . . . 1402-N) of the processing platform 1400 are assumed to be configured in a manner similar to that shown for processing device 1402-1 in the figure.

The processing platform 1400 shown in FIG. 14 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1400. Such components can communicate with other elements of the processing platform 1400 over any type of network, such as a wide area network (WAN), a local area network (LAN), a satellite network, a telephone or cable network, or various portions or combinations of these and other types of networks.

Furthermore, it is to be appreciated that the processing platform 1400 of FIG. 14 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1400 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining a data set;
calculating a set of data relevance scores for the obtained data set, the set of data relevance scores comprising a data relevance score for the data set for each of a set of specific domains associated with an entity;
obtaining an update to the data set, the update to the data set reflecting a change in data contained in the data set relative to the obtained data set;
updating the set of relevance scores for the data set based on the obtained update to the data set, the updated relevance scores reflecting a change to the relevance of the data set to one or more of the set of specific domains based on the change in the data contained in the obtained update to the data set; and
calculating a valuation for the data set based on the updated set of data relevance scores;
wherein the obtaining, calculating, updating, and calculating steps are performed by one or more processing devices, each processing device comprising a processor and a memory.

2. The method of claim 1, further comprising:
creating a set of keyword taxonomies respectively corresponding to the set of specific domains associated with the entity;
generating tokens from the data set; and assigning each of the tokens to one or more of the set of specific domains based on comparison to the set of keyword taxonomies.

3. The method of claim 2, wherein the step of calculating the set of data relevance scores further comprises calculating a relevance score for a given one of the specific domains by increasing the relevance score for the data set with respect to the given domain based on the number of tokens generated from the data set for the given domain.

4. The method of claim 1,
wherein the data set and the update are versions of the data set obtained from a data protection ecosystem, the data protection ecosystem comprising a plurality of versions of the data set, and
wherein the step of updating the set of data relevance scores further comprises evaluating a plurality of the versions of the data set stored in the data protection ecosystem, and updating one or more of the data relevance scores as the relevance to the corresponding domains changes over evaluated plurality of the versions of the data set.

5. The method of claim 4, further comprising creating a chain of sets of data relevance scores, wherein each set of data relevance scores in the chain corresponds to a different version of the plurality of versions of the data set stored in the data protection ecosystem, wherein each version of the data set is stored at a different time instance.

6. The method of claim 1, wherein the step of calculating a set of data relevance scores for the data set further comprises calculating the set of data relevance scores contemporaneous with a time of ingest of a given version of the data set into a data storage system.

7. The method of claim 1, wherein the step of calculating a set of data relevance scores for the data set further comprises calculating the set of data relevance scores based on a correlation the data set has with respect to at least another data set.

8. The method of claim 1, wherein the step of calculating a set of data relevance scores for the data set further comprises calculating the set of data relevance scores based on a workflow performed on the data set.

9. The method of claim 8, wherein the data relevance scores for the specific domains are computed based on at least one of exploration, transformation, and analysis on the data set.

10. The method of claim 1, further comprising storing the set of data relevance scores for the data set in a database.

11. The method of claim 10, further comprising accessing the database via an application programming interface.

12. The method of claim 1, further comprising:
receiving a query corresponding to the data set; and
returning the calculated valuation for the data set in response to the query.

13. An article of manufacture comprising a processor-readable storage medium having encoded therein executable code of one or more software programs, wherein the one or more software programs when executed by one or more processing devices implement steps of:
obtaining a data set;
calculating a set of data relevance scores for the obtained data set, the set of data relevance scores comprising a data relevance score for the data set for each of a set of specific domains associated with an entity;
obtaining an update to the data set, the update to the data set reflecting a change in data contained in the data set relative to the obtained data set;
updating the set of relevance scores for the data set based on the obtained update to the data set, the updated relevance scores reflecting a change to the relevance of the data set to one or more of the set of specific domains based on the change in the data contained in the obtained update to the data set; and
calculating a valuation for the data set based on the updated set of data relevance scores.

14. A system comprising:
one or more processors operatively coupled to one or more memories configured to:
obtain a data set;
calculate a set of data relevance scores for the obtained data set, the set of data relevance scores comprising a data relevance score for the data set for each of a set of specific domains associated with an entity;
obtain an update to the data set, the update to the data set reflecting a change in data contained in the data set relative to the obtained data set;
update the set of relevance scores for the data set based on the obtained update to the data set, the updated relevance scores reflecting a change to the relevance of the data set to one or more of the set of specific domains based on the change in the data contained in the obtained update to the data set; and
calculate a valuation for the data set based on the updated set of data relevance scores.

15. The system of claim 14, wherein the one or more processors operatively coupled to the one or more memories are further configured to:
create a set of keyword taxonomies respectively corresponding to the set of specific domains associated with the entity;
generate tokens from the data set; and
assign each of the tokens to one or more of the set of specific domains based on comparison to the set of keyword taxonomies.

16. The system of claim 15, wherein calculating the set of data relevance scores further comprises calculating a relevance score for a given one of the specific domains by increasing the relevance score for the data set with respect to the given domain based on the number of tokens generated from the data set for the given domain.

17. The system of claim 14,
wherein the data set and the update are versions of the data set obtained from a data protection ecosystem, the data protection ecosystem comprising a plurality of versions of the data set, and
wherein the step of updating the set of data relevance scores further comprises evaluating a plurality of the versions of the data set stored in the data protection ecosystem, and updating one or more of the data relevance scores as the relevance to the corresponding domains changes over evaluated plurality of the versions of the data set.

18. The system of claim 14, wherein calculating a set of data relevance scores for the data set further comprises calculating the set of data relevance scores contemporaneous with a time of ingest of a given version of the data set into a data storage system.

19. The system of claim 14, wherein calculating a set of data relevance scores for the data set further comprises calculating the set of data relevance scores based on a correlation the data set has with respect to at least another data set.

20. The system of claim 14, wherein calculating a set of data relevance scores for the data set further comprises calculating the set of data relevance scores based on a workflow performed on the data set.

\* \* \* \* \*